United States Patent [19]

Moore

[11] Patent Number: 4,711,659

[45] Date of Patent: Dec. 8, 1987

[54] ATTRITION RESISTANT CONTROLLED RELEASE FERTILIZERS

[76] Inventor: William P. Moore, P.O. Box 1270, Hopewell, Va. 23860

[21] Appl. No.: 897,160

[22] Filed: Aug. 18, 1986

[51] Int. Cl.[4] .................. A01N 37/38; A01N 43/48; A01N 43/64; C05C 9/00
[52] U.S. Cl. .................................. 71/93; 71/110; 71/117; 71/28; 71/64.12; 71/64.11
[58] Field of Search ............... 71/64.12, 28–30, 71/93, 1.0, 1.7

[56] References Cited

U.S. PATENT DOCUMENTS

| | | | |
|---|---|---|---|
| 3,232,739 | 2/1966 | Belak | 71/28 |
| 3,252,786 | 5/1966 | Bozzelli et al. | 71/64 |
| 3,259,482 | 7/1966 | Hansen | 71/64 |
| 3,264,089 | 8/1966 | Hansen | 71/64 |
| 3,300,293 | 1/1967 | Bozzelli et al. | 71/28 |
| 3,342,577 | 9/1967 | Blouin et al. | 71/3 |
| 3,475,154 | 10/1969 | Kato | 71/64 |
| 4,120,685 | 10/1978 | Vargiu et al. | 71/30 |

FOREIGN PATENT DOCUMENTS

| | | | |
|---|---|---|---|
| 2330847 | 1/1975 | Fed. Rep. of Germany | 71/64.12 |
| 0131062 | 5/1978 | Fed. Rep. of Germany | 71/64.12 |

OTHER PUBLICATIONS

CA 93(22):206283y, "Moisture Curable Coating Materials", 1980, Dupont.
CA 84:29810, J. Urea Fertilizer Coating, Hiroshi Takashima, Fusao Yamada; Japanese Kokai 75,129,362, Oct. 13, 1975.
CA 87:52162, U. Slow Releasing Coated Granular Fertilizer, Toshiharu Yamazaki, Masao Eguchi, Yataka Takada, Hachiro Tadenuma, Kuniharu Nakajima, Sadashi Yamashita, Japanese Kokai 77,38,361, Mar. 24, 1977.

Primary Examiner—Ferris H. Lander

[57] ABSTRACT

An attrition resistant controlled release fertilizer comprising: $NH_2$-containing water soluble central particles such as urea, surrounded and chemically bonded with a base coating, consisting of substituted ureas, formed by reacting a molecular excess of polyfunctional isocyanate with the $NH_2$ groups of the central particles, and a water insoluble layer, surrounding and chemically bonded with the base coating, formed by the reaction and polymerization of the excess isocyanate with anhydrous organic polyols. If desired, 1 to 10 water insoluble coatings may surround the sealing layer. The base coating's substituted ureas may be effectively formed with diphenylmethane diisocyanate and the sealing layer, with polyethyleneterephthalate polyester polyols containing triethanolamine or melamine catalyst. Central particles effectively coated include: urea, biuret, ureaform, guanidine, melamine, and ammonium salts. A preparation method is provided.

25 Claims, No Drawings

ATTRITION RESISTANT CONTROLLED RELEASE FERTILIZERS

BACKGROUND OF THE INVENTION

1. Field of the Invention

This invention relates to granular water soluble plant foods and their controlled release as nutrients. More particularly, it relates to attrition resistant controlled release fertilizer particles comprising a central mass of water soluble fertilizer compounds containing amino groups, a base coating of substituted ureas chemically bonded to the central mass, and a water insoluble sealing layer chemically bonded to the base coating with the sealing layer formed by the reaction of organic polyols with excess polyfunctional isocyanates from the base coat substituted urea formation.

2. Description of the Prior Art

Rapid release of water soluble plant food in soils containing plants may cause phytotoxicity to the plants, and/or the early depletion of the plant food by leaching. Plant food researchers for a long time have attempted to develop plant food particles which release nutrients at a rate about equal to their uptake by plants to minimize phytotoxicity and maximize plant food use efficiency. Improved release control has been achieved primarily with nitrogen in the form of urea, by substantially reacting it with aldehydes to form insoluble products such as ureaform, which must chemically decompose in the soil before the nitrogen becomes available for utilization by plants. Another method consists of physically coating fertilizer granules with solidified water insoluble melts. Various materials have been used as coatings, including sulfur, paraffin waxes, and plastics. These coatings must be broken down by erosion, internal vapor pressure, microbes, or attrition before the contained nutrients become available. Unfortunately, attrition in producing, storing, handling and applying the coated products prematurely breaks down the coatings causing substantial loss of release control, phytotoxic problems, and excessive nutrient leaching.

Silvio Vargiu et al in U.S. Pat. No. 4,120,685 illustrates an improved urea-aldehyde solid reaction product having properties of slow nitrogen release. Even with his improvements Vargiu obtained a nitrogen availability of about 60 percent. The remaining nitrogen is simply not available for plant uptake in a reasonable time period.

Steven Belak in U.S. Pat. No. 3,232,739 showed that free urea incorporated in polyurethane foam is slowly released into soil over a long period of time by the leaching action of water. He was able to use between 10 and 60 percent urea, but when his product contained 10 percent or more urea more than 30 percent of the urea was leached in 24 hours, indicating a nitrogen release rate high enough to cause phytotoxic problems when substantial amounts of urea fertilizer was applied.

Andrew Bozzelli et al in U.S. Pat. No. 3,252,786 disclose a solid controlled release fertilizer composition containing up to 80 percent of solid urea dispersed in petroleum wax blended with wood rosins and other wood rosin related polymers. Unfortunately even with 40 percent wax-rosin phase and only 60 percent urea, 10 percent or more of the urea was dissolved in 24 hour water soak tests. It was necessary that the urea be heated and dispersed in the molten wax and then molded and cooled to form pellets. Attrition with this type of coated particle is a problem because there is no real bond between the urea and the wax and the release control depends upon the small particles of urea being imbedded in a large amount of wax.

Louis Hansen advanced the art in U.S. Pat. No. 3,259,482 by disclosing a delayed release fertilizer containing a core of fertilizer encapsulated or coated with a plurality of water insoluble coatings composed of a mixture of epoxidized soybean oil and a polyester curing agent. At the time of use the materials are combined and the resultant mixture is spread in film form over the fertilizer granule. It is necessary to dry and cure the Hansen product and the heat and escaping vapors open pores for subsequent water intrusion into the soluble fertilizer. Coating adhesion problems are encountered because there is no chemical bond with the central fertilizer mass or particle.

A further disclosure by Hansen in U.S. Pat. No. 3,264,089 teaches that a slow-release fertilizer can be prepared by encapsulating or coating fertilizer granules with well known urethane resins. The polyurethane polymers were generally diluted with solvents and stored until they were applied. A plurality of coatings was required, each amounting to about 0.25 to 3 percent by weight, to give a total coating weight of between 3 and 15 percent. Each successive coating, or layer, must be dried to gelation so that it is not loosened by subsequent solvent wet coating. Hansen found it helpful to precoat the fertilizer granules with a drying oil and a fine clay before application of his urethane resin, but did not chemically react the central fertilizer mass with a base coating material to produce a stable chemical bond. He taught a physical seal of a plurality of water insoluble coatings over the soluble fertilizer granule. Escaping solvent causes bubbles and holes in this type of coating and creates routes for excess water penetration.

Sulfur coated fertilizer, particularly urea, is a widely used form of controlled release plant food nutrients. Glenn Blouin et al disclosed an improved sulfur coated granule process in U.S. Pat. No. 3,342,577, wherein a plurality of layers of molten sulfur is applied to fertilizer granules. An oil based sealer, such as polyethylene plastic dissolved in light petroleum oil, is required to produce slow nutrient dissolution rates and a conditioner, such as diatomaceous earth, is required to eliminate stickiness. Sulfur coated urea is subject to appreciable attrition and cracking when handled in commercial fertilizer systems. Temperature variations cause coating cracking and increased nutrient release rates. The large amounts of sulfur coating required to prevent rapid leaching of nutrients cause the occlusion of some of the nutrients so that they are not released in a useful time period.

It has long been an object of those skilled in the art to produce controlled release fertilizers having substantial resistance to attrition from shipping, handling and application, by applying economically small amounts of coating material.

It is therefore an object of this invention to provide new coated fertilizer particles which release soluble fertilizer nutrients in a slow and controlled manner even with the use of small amounts of coating material.

It is another object to provide coated fertilizer particles with coatings so securely bonded to the soluble fertilizer that little, or no, attrition occurs and release control is maintained even when the coated particles receive severe vibration, and abrasion through repeated rough handling.

It is a further object to provide an effective method for preparing these attrition resistant controlled release coated fertilizer particles.

SUMMARY OF THE INVENTION

I have discovered a new composition of controlled release fertilizer particles which have remarkably high resistance to attrition and a method for their preparation. The fertilizer particle composition is a water soluble central mass containing $NH_2$ groups, a base coating surrounding and chemically bonded to the central mass, and a water insoluble sealing layer surrounding and chemically bonded to the base coating. The base coating strongly connects itself and subsequent layers to the water soluble central mass so that the coated particle is highly resistant to attrition even under conditions of extreme vibration, impact, and abrasion. The strong connection of the base coating is achieved by the chemical reaction of liquid polyfunctional isocyanate with the $NH_2$ groups at, and near, the surface of the water soluble central mass, to form substituted ureas which are integral parts of the central mass and the base coating.

The base coating is surrounded and chemically bonded by a water insoluble sealing layer which provides a barrier to moisture penetration and the release of the soluble fertilizer from the central mass of the particle. The sealing layer is formed by reacting an organic polyol with excess polyfunctional isocyanate included with the substituted ureas at the surface of the base coating, thus chemically bonding the sealing layer with the base coating.

The method for the preparation of these particles requires surrounding and chemically bonding particles of water soluble fertilizer compounds containing $NH_2$ functional groups with a base coating consisting of substituted ureas by applying a molecular excess of liquid polyfunctional isocyanate to a mobile mass of the particles of fertilizer at a temperature between 30° and 160° C. and holding for a period of time between 1 and 60 minutes. Then the base coating is surrounded and chemically bonded with a water insoluble sealing layer by reaction and polymerization of the excess polyfunctional isocyanate of the base coating with an amount of anhydrous organic polyol to produce an isocyanate (NCO) to hydroxyl (OH) moiety ratio between 1 and 3, by applying the polyol to a mobile mass of the base coated particles at a temperature between 60° C. and 160° C. and holding for a period of time between 1 and 60 minutes.

DESCRIPTION OF THE INVENTION

The attrition resistant, controlled release, fertilizer particle composition of this invention contains a water soluble central mass of plant food. The plant food is a chemical compound, or compounds, normally used for plant nutrition. I have found that this central mass must contain at least 10 percent $NH_2$ (amino) functional groups to provide the reaction sites for chemically bonding a base coating. All percents used throughout this disclosure are by weight unless otherwise specified.

A base coating surrounds and chemically bonds to the central mass. The base coating consists of substituted ureas formed by reacting a molecular excess of a liquid polyfunctional isocyanate with the $NH_2$ groups of the central mass. The chemical bond is formed by the penetration of the isocyanate at and near the surface of the central mass to react with the $NH_2$ groups available there. A molecular excess of isocyanate means that sufficient NCO (isocyanate) groups are present to react with all the $NH_2$ groups available at the surface of the central mass, and to provide sufficient unreacted NCO groups to form a chemical bond with the sealing layer.

A water insoluble sealing layer surrounds and chemically bonds to the base coating. It is formed by the reaction and polymerization of the excess polyfunctional isocyanate of the base coating with an amount of anhydrous organic polyol sufficient to produce a ratio of NCO to OH groups between 1 and 3.

The term polyfunctional isocyanate is used to define aliphatic, aromatic, and aliphatic aromatic polyisocyanate compounds generally known as polyisocyanates. These compounds contain two or more NCO groups available for reaction, and are widely used in the production of polyurethane polymers.

The term organic polyol is used to define organic compounds containing two or more OH groups located on an aliphatic or aromatic carbon skeleton. Because of the nucleophilic nature of the OH groups these compounds may be readily reacted and polymerized with the electrophylic polyfunctional isocyanates. The organic polyols used in the instant invention must be substantially anhydrous. Any water present reacts with the isocyanates to produce carbon dioxide gas, thereby blowing perforations through the sealing layer and allowing higher than desired moisture penetration of the sealing layer. I have found that the use of low molecular weight polyols, such as ethylene or propylene glycols, or blended polyols containing substantial amounts of low molecular weight polyols also cause the generation of some carbon dioxide and creates ineffective sealing layers.

The term substituted urea is used to define compounds such as RNHCONHR' formed by the reaction of the NCO group in RNCO with the $NH_2$ group of R'$NH_2$. The substituted ureas are solids exhibiting limited water solubility. They are too soluble to protect the central soluble mass of plant food from dissolution by water. These ureas form a very strong physical and chemical bond between the soluble central mass and the water insoluble sealing layer. The exact reason for this exceptionally strong bond is unknown but it is thought to be related to the chemical similarity of the substituted ureas to both the $NH_2$ groups of the central mass and the isocyanate-based polymers in the sealing layer.

I have found that the rate of fertilizer release from the central mass may be further reduced without increasing attrition resistance by use of a particle composition having between 1 and 10 water insoluble coatings surrounding the sealing layer. More than 5 coatings allowed essentially no release of nutrients after exposure to water. It was found that these water insoluble coatings were effective when they amounted to between 0.5 and 5.0 percent of the fertilizer particles. Lower amounts did not appreciably decrease water penetration and higher amounts caused a decrease in the coating strength and resistance to attrition.

To achieve the desired chemical bond between the base coating and the central mass of soluble fertilizer it was necessary that the polyfunctional isocyanate used in the composition be fluid and have a kinematic viscosity lower than 200 centipoise at 25° C. and preferably between 60 and 120, and that it be chemically reactive and have a NCO content between 20 and 35 percent, and preferably between 30 and 33 percent.

The amount of base coating is critical to the attrition resistance of the coated particle. It was found that polyfunctional isocyanate in the base coating amounting to between 0.3 and 2.5 percent of the total fertilizer particle was required. Lower amounts produced insufficient substituted urea for a satisfactory bond while larger amounts were difficult to apply in a practical manner.

It was also found that the composition of this invention had the desired properties of attrition resistance and controlled nutrient release when the organic polyol of the water insoluble sealing layer was selected from aliphatic, aromatic, and aliphatic aromatic polyether and polyester compounds, or their mixtures, which terminate in two or more OH groups. These polyols may be simple polyethers, such as those produced by the reaction and polymerization of ethylene oxide with ethylene glycol, or complicated ones involving reactions and polymerizations of aromatic groups, and amine terminating groups. The polyesters may be simple ones, such as those formed by the reactions and polymerization of ethylene glycol with terephthatic acid or complicated ones containing additional monomers. Additionally, it was found that a mixture of polyethers and polyesters could be used effectively as the organic polyols. To secure a satisfactory sealing layer, it was necessary that the polyols contain less than 0.1 percent water and exhibit hydroxyl numbers between 200 and 400. Polyols outside that range produced perforated seals or reacted slowly and incompletely with the isocyanates.

It was found that the strength of the sealing layer was increased when between 1 and 20 percent reaction catalysts were included in the organic polyols. Materials found to catalyze the reaction of the polyols to form an effective sealing layer included alkanolamines, melamine, alkylamines, tin octoate, and iron octoate.

The supply of $NH_2$ in the central water soluble mass of the fertilizer compounds is critical to the instant invention. Urea, biuret, guanidine, ureaform (methylene urea polymer), melamine, and ammonia compounds were found to supply satisfactory amounts of $NH_2$ groups when used as a simple granule or when combined with other plant nutrients to form a composite granule containing the necessary amounts of $NH_2$.

It was found that the particles of this invention could be readily combined into a mass for practical use as a commercial fertilizer in bulk or bagged form. It was further found that the mass of these particles required no conditioning, such as adding diatomaceous earth, to make them free flowing and storage stable for long periods of time without agglomerating.

A particularly effective fertilizer particle composition of this invention, especially useful as a commercial controlled release fertilizer, comprises a central mass of urea containing between 26 and 53 percent $NH_2$ functional groups; a base coating, surrounding and chemically bonded to the central mass by reacting a molecular excess of polymeric diphenylmethane diisocyanate, amounting to between 0.5 and 1.5 percent of the fertilizer particle and containing between 30 and 33 percent NCO, with the $NH_2$ functional groups from the central mass of urea; a water insoluble sealing layer surrounding and chemically bonded to the base coating, formed by the reaction and polymerization of the excess polymeric diphenylmethane diisocyanate of the base coating, with an amount of polyalkyleneterephthalate polyester polyol to produce a NCO to OH moiety ratio between 1.1 and 1.8, with the polyol containing between 5 and 15 percent trialkanolamine and less than 0.1 percent water and exhibiting a hydroxyl number between 225 and 350; and between 1 and 5 water insoluble coatings surrounding the sealing layer with each coating amounting to between 0.5 and 1.5 percent of the fertilizer particle, the coatings consisting of layers of polymeric diphenylmethane diisocyanate and polyalkyleneterephthalate polyester polyol applied in alternate layers to produce a NCO to OH moiety ratio in the water insoluble coatings between 1.0 and 1.5.

It was found that polyethyleneterephthalate polyester polyols exhibiting a hydroxyl number between 275 and 325 and a kinematic viscosity between 12,000 and 16,000 centipoise at 25° C. were particularly effective polyalkyleneterephthalates for the instant composition. It was further found that this material reclaimed as still bottoms, and by other methods, in the production of polyesters for plastics or fibers, was an economical and effective polyol for use in the instant invention.

The method of preparation was important in securing an effective, attrition resistant, controlled release, particle composition. For example, it was not possible to obtain the secure chemical bond between the base coating and the central mass of soluble fertilizer by dissolving a water insoluble resin such as polyurethane in an organic solvent, applying that liquid to the particle and evaporating the solvent. It was also not possible to obtain such a secure bond by applying a molten thermoplastic material such as wax, polyethylene or polystyrene to the soluble particle and cooling. Further, it was not possible to simply add preformed substituted ureas to the central soluble particle mass to produce the strong base coat. It was necessary that these substituted ureas be formed in-situ.

I have discovered an effective method by which the particulate fertilizers of this invention may be prepared. It comprises: surrounding and chemically bonding particles of water soluble fertilizer materials, preferably consisting of urea, biuret, guanidine, ureaform, alkylurea, melamine, and ammonia compounds, containing at least 10 percent, and preferably between 26 and 53 percent $NH_2$ functional groups, with a base coating, consisting of substituted ureas by applying a molecular excess of liquid polyfunctional isocyanate, preferably between 0.5 and 1.5 percent of polymeric diphenylmethane diisocyanate containing between 30 and 33 percent NCO, to a mobile mass of the particles of fertilizer at a temperature between 30° and 160° C., preferably between 80° and 120° C., and holding for a period of time between 1 and 60 minutes, preferably between 2 and 10 minutes.

I have found that several practical methods may be used to create the mobile mass of particles of fertilizer for applying the base coating and sealing layers of this invention, and that the method may be carried out batchwise or continuously. A rotary drum was found to work satisfactorily. When this apparatus was used in a continuous manner, it was necessary that it be operated so that there was little backmixing as the reactants passed through the rotary drum. Further, it was necessary that polyfunctional isocyanate and the anhydrous polyol be sprayed onto the particles through multiple addition points in the order required to produce the base coating, the sealing layer, and the water insoluble coatings. It was also found possible to perform the method of this invention in fluid beds. When operating continuously, the fluid beds were operated in series, with one reactant added in each of the continuous fluid beds.

When the base coating has been completed, the method may be continued by surrounding and chemically bonding the base coating with a water insoluble sealing layer by reaction and polymerization of the excess polyfunctional isocyanate, preferably diphenylmethane diisocyanate, of the base coating with an amount of anhydrous organic polyol, preferably polyalkyleneterephthalate polyester polyol, to produce a NCO to OH moiety ratio between 1 and 3, preferably between 1.1 and 1.8. I have found that best results are obtained when the polyol contains between 1 and 15 percent of a reaction catalyst and less than 0.1 percent water and has a hydroxyl number between 225 and 350. Suitable reaction catalysts were found to be alkanolamines, melamine, alkylamines, tin octoate, and iron octoate. The surrounding and chemically bonding of the base coating with a water insoluble sealing layer is carried out by applying the polyol to a mobile mass of base coated particles at a temperature between 60° and 160° C., preferably 80° to 120° C., and holding for a period of time between 1 and 60 minutes, preferably between 2 and 10 minutes.

The method of this invention provides for the addition of more resistance to water penetration, if desired. This is accomplished by surrounding the sealing layer with between 1 and 5 water insoluble coatings, with each coating amounting to between 0.5 and 1.5 percent of the fertilizer particle, by applying alternate layers of polyfunctional isocyanate, preferably diphenylmethane diisocyanate, and anhydrous polyalkyleneterephthalate polyester polyol to produce a NCO to OH moiety ratio between 1.0 and 1.5, to a mobile mass of the fertilizer particles at a temperature between 100° and 150° C., and holding for a period of time between 2 and 10 minutes.

I have found that it is possible to include substantial amounts of diluent fillers in the sealing layer or the water insoluble coatings as long as the composition and method of the instant invention is adhered to. Inert powders such as Wollastonite, lime, silica, dolomite, and rouge may be used as diluent fillers to reduce the consumption of the polyfunctional isocyanates and polyols while retaining the resistance to attrition and controlled nutrient release.

Finely divided plant nutrients, particularly those chemicals known as micronutrients, may also be used effectively as diluent fillers in the sealing layer and water insoluble coatings. Some of the micronutrients found to be particularly suitable for inclusion as diluent fillers are oxides and sulfates of zinc, copper, manganese, and iron.

Agricultural chemicals which affect the performance of growing plants may also be included in finely divided form as diluent fillers. Some of the agricultural chemicals found to be particularly effective include: herbicides, hexazinone, 2,4-D, and atrazine.

It was found that the diluent fillers may be applied by blending with the polyols and applying the combination as a liquid dispersion. Where the diluents are finely divided dry powders it was found that they may be applied between the base coat and the sealing layer, between the sealing layer and the water insoluble coating, and between the water insoluble coatings with each layer of powder applied prior to the application of polyol. Application is made by adding the dry powder diluent to a mobile mass of coated particles to which additional layers of polyfunctional isocyanates and organic polyols are added to react according to the instant invention.

It is necessary to limit the amount of diluent filler used to no more than two times the weight of the polyol used in forming the granule, and the amount was preferably limited to a weight equal to that of the polyol to obtain excellent attrition resistance.

Several different diluent fillers may be employed in several sequential layers of a single particle or mass of particles. Thus, it was found possible to carry diluents of inerts, herbicides, and nutrients in a given particle or particles.

MODE OF OPERATION OF INVENTION

Having described the basic concepts of the instant invention, reference is now made to the following examples which are provided to illustrate the best composition, the preferred method of its preparation, and comparative evaluations with prior art compositions.

EXAMPLE 1

A sample of $-6+14$ U.S. Standard Mesh Screen Size granular fertilizer particles was prepared which was composed of water soluble central masses (granules) of urea, containing 53 percent $NH_2$ functional groups; and a base coating, surrounding and chemically bonded to the central mass, consisting of the substituted ureas resulting from the reaction of 1.3 percent (by weight of the granular fertilizer particles) polymeric diphenylmethane diisocyanate with the $NH_2$ functional groups at the surfaces of the central masses of the urea particles. The polymeric diphenylmethane diisocyanate, sometimes designated as isocyanic acid, polymethylene poly phenylene ester, was a liquid containing about 65 percent diphenylmethane diisocyanate (commonly abbreviated as MDI) and about 35 percent of higher oligomers of MDI, having a kinematic viscosity at 25° C. of 80 centipoise, and average molecular weight of 350, a specific gravity of 1.24, and an isocyanate (NCO) functional group concentration of 31.9 percent. There was sufficient polymeric diphenyldimethane diisocyanate so that all of the NCO functional groups were not reacted by the $NH_2$ groups at the surface of the urea granules while forming the base coating.

The sample composition included a water insoluble sealing layer, surrounding and bonded to the base coating, which layer was formed by the reaction and polymerization of the excess diphenylmethane diisocyanate of the base coating with a polyethyleneterephthalate polyester polyol which provided one OH group (moiety) per 1.3 NCO group (moiety) used in preparing the base coating. The polyol used was a by-product recovered as still-bottoms in the recovery of glycols from polyester production from glycols and terephthalic acid. Moisture content was less than 0.1 percent, free diethylene glycol content was 8 percent and the hydroxyl number of the polyol was 319. The polyol contained 10 percent triethanolamine as reaction-polymerization catalyst. The total weight of the base coating and sealing layer was 3 percent of the granular fertilizer particles.

Examination of the individual particles with a 200 power laboratory microscope showed the base coatings and the sealing layers to be continuous, smooth, and completely attached to the central particles, with no visible holes or cracks.

EXAMPLE 2

Microscopic examination was made of two samples of −6+14 mesh granules of coated urea. The first was coated with 18 percent element sulfur, prepared by applying molten sulfur, cooling, sealing with 0.6 percent polyethylene in bright oil, then conditioned with 1.1 percent fine diatomaceous earth powder. The second was prepared by spraying on layers of polyurethane polymer dissolved in a volatile hydrocarbon solvent. The total amount of urethane resin applied amounted to 5 percent by weight.

The sulfur coated urea was observed to contain a large number of cracks, and areas of lumps or thick sulfur coats.

The urethane coated urea particles were found to contain areas where the coating was not attached and not in contact with the central urea particle. The coatings contained a substantial number of bubbles and some holes created by the escaping solvent vapors.

EXAMPLE 3

Samples amounting to 500 grams each of the Example 1 composition, and the sulfur and urethane coated urea granules of Example 2 were tested for resistance to attrition and were placed in a 6 inch diameter×8 inch long procelain laboratory ball mill containing 40 steel balls, about 1 centimeter in diameter, and allowed to roll for 20 minutes at 100 rpm providing a high degree of abrasion and impact. At the end of the test period, the sample granules were removed and attrition was measured by screening in a vibratory shaker for 5 minutes. The amount of material passing through a 16 mesh screen from each sample was weighed. No appreciable amount of fines were produced from the composition of Example 1. The fines from the sulfur coated urea and the urethane coated urea amounted to 7.2 and 1.8 grams, respectively.

EXAMPLE 4

Samples from the attrition resistance test of Example 3, each amounting to 25 grams, were placed in 100 grams of water and stored for 24 hours at 100° F. in a quiet closed bottle. The amounts of urea dissolved from the composition of Example 1, the urethane coated urea, and the sulfur coated urea were: 7.1, 43.6, and 78.3 percents, respectively.

EXAMPLE 5

To a laboratory rotary drum coater, 24 inches in diameter, 10 inches long, fitted with 15 slanted lifts to induce particle rolling, 4000 grams of −4+6 mesh granular urea particles containing 52 percent $NH_2$ groups were added and rotation of the drum at 30 rpm was initiated. A base coating surrounding and bonded to the urea was formed by spraying 1.0 percent of liquid polymeric diphenylmethane diisocyanate containing 30 percent NCO and consisting of 50 percent diphenylmethane diisocyanate (MDI) and 50 percent of higher oligomers of DMI onto the surfaces of the mobile mass of urea granules in the coater at 110° C., and allowed to react and produce substituted urea for a period of 2 minutes. The molecular excess of unreacted NCO groups remaining on the outer surface of the base coating made the particle slightly tacky at this intermediate stage of the method.

To produce a sealing layer on the base coating, the rotation of the coating drum was continued and onto the mobile mass of particles in the drum was sprayed 1.5 percent of a polyol which was preheated to 80° C. to improve its reactivity and spread rate over the granules. The polyol consisted of scrap terephthalate polyester plastic bottles, ground and dissolved by refluxing in triethylene glycol. This economic polyester polyol had a hydroxyl number of 240 and contained 9 percent triethylene glycol and less than 0.1 percent water and exhibited a viscosity of 13,800 centipoise at 25° C. Prior to its use, 10 percent triethanolamine was added as a reaction and polymerization catalyst to the polyol. The sealing layer was formed by holding the temperature of coated particles at 112° C. for 2 minutes. About half of the particles were discharged hot from the coating drum, and were found to be hard, and very resistant to attrition and water dissolution.

EXAMPLE 6

Two-thousand grams of the product from Example 5 was retained in the rotary drum and alternate layers of the diisocyanate and polyols of Example 5 were sprayed onto the mass of sealing layer coated urea particles at 120° C. Each two applications were allowed to polymerize for 4 minutes before another series of sprays was applied. Each series of sprays contained 1.0 percent of the diisocyanate and 1.4 percent of the polyol. Two series of water insoluble coatings were applied over the sealing layer, giving a total coating of 7.3 percent coating.

Microscopic inspection of the coated granules showed them to be substantially free of holes, bubbles and cracks. Each coating appeared to be substantially a part of the coating which it covered and there were no voids between the central urea particles and the coatings.

EXAMPLE 7

The product from Example 6 was given the attrition test of Example 3 and less than 0.1 gram of fines were produced. A 2000 gram sample of polyurethane coated urea was prepared by coating −4+6 mesh urea with 4 layers each amounting to 2 percent polyurethane polymer, by application as a hydrocarbon solution and evaporating the solvent from each layer. A 2000 gram sample of the same urea granules was coated with 28 percent elemental sulfur with 0.5 percent sealer and 1.0 percent conditioner. Samples of the sulfur and urethane coated urea granules were given the attrition test of Example 3, and attrition amounted to 4.7 and 1.1 grams, respectively.

EXAMPLE 8

The samples given the attrition resistance tests of Example 8, after discarding the fines, were given the water dissolution test of Example 4, except in this test the coated granules were allowed to stand for 7 days before the amount of urea dissolved out of the granules was measured. Only 7.4 percent of the urea in the granules produced in Example 6 dissolved, compared with 47.7 percent of the urethane coated urea and 61.1 percent of the sulfur coated urea of Example 7.

EXAMPLE 9

Example 5 was repeated using, as the central soluble mass, −6+14 mesh particles of cogranulated urea and melamine containing 45 percent melamine and 55 percent urea, and the two additional series of water insoluble coatings were added as in Example 6, producing a total coating of 7.5 percent. Microscopic inspection showed the seal of the coating to be complete, and the 7 day water dissolution test of Example 8 showed the total nitrogen dissolved was equivalent to 3.8 percent of the contained urea.

I claim:

1. An attrition resistant, controlled release, fertilizer particle composition, comprising:
    (a) a water soluble central mass of a plant food compound containing $NH_2$ functional groups amounting to at least 10 percent;
    (b) a base coating, surrounding and chemically bonded to the central mass and consisting of substituted ureas, formed by reacting a molecular excess of a liquid polyfunctional isocyanate with the $NH_2$ functional groups of the central mass; and
    (c) a water insoluble sealing layer, surrounding and chemically bonded to the base coating, formed by the reaction and polymerization of the excess polyfunctional isocyanate of the base coating with an amount of anhydrous organic polyol sufficient to produce a NCO to OH moiety ratio between 1 and 3.

2. The fertilizer particle composition of claim 1 wherein water insoluble coatings surround the sealing layer, each water insoluble coating amounting to between 0.5 and 5.0 percent of the fertilizer particle, and the number of water insoluble coatings amounting to between 1 and 10.

3. The composition of claim 1 wherein the polyfunctional isocyanate has a viscosity lower than 200 centipoise at 25° C. and an NCO content between 20 and 35 percent.

4. The composition of claim 1 wherein the polyfunctional isocyanate in the base coating amounts to between 0.3 and 2.5 percent of the fertilizer particle.

5. The composition of claim 1 wherein the polyfunctional isocyanate in the base coating is polymeric diphenylmethane diisocyanate, containing between 30 and 33 percent NCO, and exhibiting a viscosity of between 60 and 120 centipoise at 25° C.

6. The composition of claim 1 wherein the organic polyol of the water insoluble sealing layer is selected from the group consisting of aliphatic, aromatic and aliphatic aromatic polyethers and polyesters terminating in a plurality of OH groups, the polyols containing less than 0.1 percent water and exhibiting hydroxyl numbers between 200 and 400.

7. The composition of claim 1 wherein the organic polyol contains a catalyst amounting to between 1 and 20 percent, selected from the group consisting of alkanolamines, melamine, alkylamines, tin octoate, and iron octoate.

8. The composition of claim 1 wherein the water soluble central mass is a particle of fertilizer selected from the group consisting of urea, biuret, guanidine, ureaform, melamine.

9. An attrition resistant, controlled release, granular fertilizer comprising a plurality of the particles of claim 1.

10. The composition of claim 1 wherein finely divided diluent fillers are included between the base coating and the sealing layer, between the sealing layer and the water insoluble coating, and between the water insoluble coatings, with each application of diluent filler made prior to the application of the organic polyol, the diluent filler weight amounting to no more than two times that of the organic polyol in the composition.

11. The composition of claim 10 wherein the diluent filler is an inert powder; selected from the group consisting of Wollastonite, lime, silica, dolomite, and rouge.

12. The composition of claim 10 wherein said filler is a plant micronutrient selected from the group consisting of oxides and sulfates of zinc, copper, manganese, and iron.

13. The composition of claim 10 wherein said fillers are herbicides selected from the group consisting of hexazinone, 2,4-D, and atrazine.

14. An attrition resistant, controlled release, granular fertilizer particle composition, comprising:
    (a) a central mass of urea containing between 26 and 53 percent $NH_2$ functional groups;
    (b) a base coating, surrounding and chemically bonded to the central mass and consisting of substituted ureas formed by reacting a molecular excess of polymeric diphenylmethane diisocyanate, amounting to between 0.5 and 1.5 percent of the fertilizer particle and containing between 30 and 33 percent NCO, with the $NH_2$ functional groups from the central mass of urea;
    (c) a water insoluble sealing layer, surrounding and chemically bonded to the base coating, formed by the reaction and polymerization of the excess polymeric diphenylmethane diisocyanate of the base coating, with an amount of polyalkyleneterephthalate polyester polyol to produce a NCO to OH moiety ratio between 1.1 and 1.8, the polyol exhibiting a hydroxyl number between 225 and 350, and containing between 5 and 15 percent trialkanolamine and less than 0.1 percent water;
    (d) between 1 and 5 water insoluble coatings, surrounding the sealing layer, each coating amounting to between 0.5 and 1.5 percent of the fertilizer particle, the coatings consisting of polymeric diphenylmethane diisocyanate and polyalkyleneterephthalate polyester polyol applied in alternate layers to produce a NCO to OH moiety ratio in the water insoluble coatings between 1.0 and 1.5.

15. The composition of claim 14 wherein the polyalkyleneterephthalate polyester polyol is polyethyleneterephthalate polyester polyol exhibiting a hydroxyl number between 275 and 325 and a viscosity between 12,000 and 16,000 centipoise at 25° C.

16. A stepwise method of producing an attrition resistant particulate fertilizer, comprising:
    (a) surrounding and chemically bonding particles of water soluble fertilizer material, containing at least 10 percent $NH_2$ functional groups, with a base coating consisting of substituted ureas, by applying a molecular excess of liquid polyfunctional isocyanate to a mobile mass of the particles of fertilizer at a temperature between 30° and 160° C. and holding for a period of time between 1 and 60 minutes;
    (b) surrounding and chemically bonding the base coating with a water insoluble sealing layer by reaction and polymerization of the excess polyfunctional isocyanate of the base coating with an amount of anhydrous organic polyol to produce a NCO to OH moiety ratio between 1 and 3, by applying the polyol to a mobile mass of base coated particles at a temperature between 60° and 160° C. and holding for a period of time between 1 and 60 minutes.

17. The method of claim 16 wherein diluent fillers are dispersed in the anhydrous organic polyol used to form a water insoluble sealing layer by reaction and polymerization with the excess polyfunctional isocyanate of the base coating, the diluent fillers being substantially included in the water insoluble sealing layer.

18. The method of claim 16 wherein a plurality of diluent filler layers are coated onto the particles as finely divided dry powder with each layer of powder applied prior to the application of the polyol used to form a water insoluble sealing layer by reaction and polymerization with the excess polyfunctional isocyanate of the base coating, the dry powder being included between the base coating and the water insoluble sealing layers, by the said reaction and polymerization.

19. The method of claim 16 wherein water insoluble coatings, each amounting to between 0.5 and 1.5 percent of the fertilizer particles, are formed surrounding the sealing layers of the particles by applying alternate layers of polymeric diphenylmethane diisocyanate and anhydrous liquid polyol to a mobile mass of the fertilizer particles and allowing between 1 and 10 minutes reaction time for each coating at 60° to 160° C., the number of insoluble coatings amounting to between 1 and 5.

20. The method of claim 16 wherein the organic polyol contains a reaction catalyst amounting to between 1 and 15 percent, selected from the group consisting of alkanolamines, melamine, alkylamines, tin octoate, and iron octoate.

21. The method of claim 16 wherein the water soluble fertilizer material is selected from the group consisting of urea, biuret, guanidine, alkylurea, melamine and ammonia compounds.

22. The method of claim 16 wherein the stepwise bonding of the water soluble fertilizer material with a base coating of substituted ureas and the bonding of the base coating with a water insoluble sealing layer are performed in a continuous rotary drum containing multiple addition points for the polyfunctional isocyanate and the anhydrous organic polyol.

23. A stepwise method of producing an attrition resistant particulate fertilizer, comprising:
   (a) surrounding and chemically bonding urea particles containing between 26 and 53 percent $NH_2$ functional groups, with a base coating consisting of substituted ureas, by applying a molecular excess of polymeric diphenylmethane diisocyanate, amounting to between 0.5 and 1.5 percent of the fertilizer particle and containing between 30 and 33 percent NCO, to a mobile mass of the particles of fertilizer at a temperature between 80° and 120° C. and holding for a period of time between 2 and 10 minutes;
   (b) surrounding and chemically bonding the base coating with a water insoluble sealing layer by reaction and polymerization of the excess polymeric diphenylmethane diisocyanate of the base coating with an amount of polyalkyleneterephthalate polyester polyol to produce a NCO to OH moiety ratio between 1.1 and 1.8, the polyol containing between 5 and 15 percent triethanolamine and less than 0.1 percent water and exhibiting a hydroxyl number between 225 and 350, by applying the polyol to a mobile mass of base coated particles at a temperature between 100° and 150° C. and holding for a period of time between 2 and 10 minutes;
   (c) surrounding the sealing layer with between 1 and 5 water insoluble coatings, each coating amounting to between 0.5 and 1.5 percent of the fertilizer particles, by applying alternate layers of polymeric diphenylmethane diisocyanate and anhydrous polyalkyleneterephthalate polyester polyol with a NCO to OH moiety ratio between 1.0 and 1.5 to a mobile mass of the fertilizer particles at a temperature between 100° and 150° C. and holding for a period of time between 2 and 10 minutes.

24. The method of claim 23 wherein the mobile mass of the fertilizer particles are contained in a fluid bed reactor.

25. The method of claim 23 wherein the mobile mass of the fertilizer particles are contained in a rotary drum.

* * * * *